(12) United States Patent
Bajaj et al.

(10) Patent No.: US 8,695,101 B2
(45) Date of Patent: *Apr. 8, 2014

(54) DATA PRIVACY ENGINE

(75) Inventors: Rima Bajaj, New Delhi (IN); Hyman D. Chantz, Scarsdale, NY (US); David A. Chapin, Austin, TX (US); Amy E. Creswick, Brentford (GB); Eduardo M. Da Silva, Curitiba (BR); Alison L. Graham, New York, NY (US); Chee Yen Lim, Kuala Lumpur (MY); Adam C. Nelson, Barrington, IL (US); Nicholas J. Norris, The Woodlands, TX (US); Gregory J. Riche, Montclair, NJ (US); Varun Sharma, Noida (IN); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,474

(22) Filed: Apr. 9, 2012

(65) Prior Publication Data
US 2013/0269035 A1 Oct. 10, 2013

(51) Int. Cl.
*G06F 7/04* (2006.01)
(52) U.S. Cl.
USPC .................................. 726/26; 726/27; 726/2
(58) Field of Classification Search
None
See application file for complete search history.

(56) References Cited

U.S. PATENT DOCUMENTS

| | | | |
|---|---|---|---|
| 6,904,417 B2 * | 6/2005 | Clayton et al. | 705/59 |
| 2005/0149452 A1 | 7/2005 | Clayton et al. | |
| 2007/0094394 A1 | 4/2007 | Singh et al. | |
| 2008/0062992 A1 | 3/2008 | Sawada et al. | |
| 2011/0202457 A1 * | 8/2011 | Lawrence | 705/39 |

OTHER PUBLICATIONS

"International Privacy Laws" 2004-2011, Information Shield, Inc. http://www.informationshield.com/intprivacylaws.html.

* cited by examiner

*Primary Examiner* — Pramila Parthasarathy
(74) *Attorney, Agent, or Firm* — John R. Pivnichny; Law Office of Jim Boice

(57) ABSTRACT

A computer hardware-implemented method, system, and/or computer program product determines an applicability of a data privacy regulation when transmitting data used with an enterprise project. A data privacy regulation describes regulatory restrictions on data being transmitted from a first geopolitical entity to a second geopolitical entity. A set of categorized data is used by an enterprise project, and the data privacy regulation establishes limitations on a transmission of at least one category of data, from the set of categorized data, from the first geopolitical entity to the second geopolitical entity. A first set of binary data and a second set of binary data are processed to determine if transmission of said at least one category of data from the first geopolitical entity to the second geopolitical entity is regulated by the data privacy regulation.

17 Claims, 5 Drawing Sheets

DATA PRIVACY ENGINE

BACKGROUND

The present disclosure relates to the field of computers, and specifically to the use of computers when used to implement an enterprise project. Still more particularly, the present disclosure relates to the use of computers when transmitting sensitive data from one geopolitical entity to another geopolitical entity.

An enterprise project, also known as an initiative, is defined as a project undertaken by an enterprise to perform one or more tasks. For example, an initiative may process credit card transactions, generate bills for services, process medical data for a research project, etc. Such initiatives often require that data be transmitted from one geopolitical entity (i.e., any geopolitical entity such as a country, a state, a province, etc.) to another geopolitical entity.

SUMMARY

A computer hardware-implemented method, system, and/or computer program product determines an applicability of a data privacy regulation when transmitting data used with an enterprise project. A data privacy regulation describes regulatory restrictions on data being transmitted from a first geopolitical entity to a second geopolitical entity. A set of categorized data is used by an enterprise project, and the data privacy regulation establishes limitations on a transmission of at least one category of data, from the set of categorized data, from the first geopolitical entity to the second geopolitical entity. A first set of binary data and a second set of binary data are processed to determine if transmission of said at least one category of data from the first geopolitical entity to the second geopolitical entity is regulated by the data privacy regulation.

DETAILED DESCRIPTION

Figure 1:
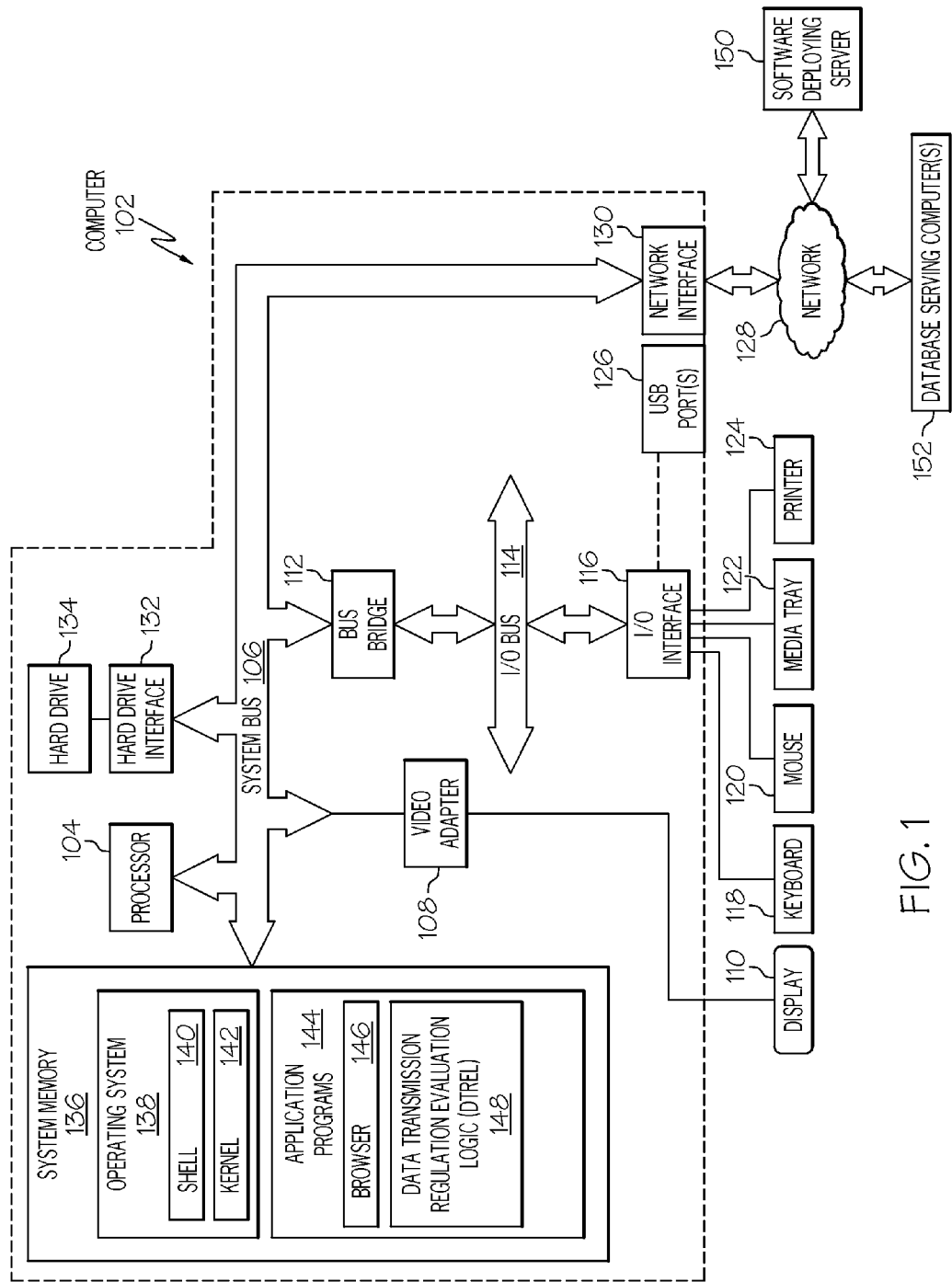
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or database serving computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, as well as database serving computer(s) 152, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a data transmission regulation evaluation logic (DTREL) 148. DTREL 148 includes code for implementing the processes described below, including those described in FIGS. 2-5. In one embodiment, computer 102 is able to download DTREL 148 from software deploying server 150, including in an on-demand basis, wherein the code in DTREL 148 is not downloaded until needed for execution. Note further that, in one embodiment of the present invention, software deploying server 150 performs all of the functions associated with the present invention (including execution of DTREL 148), thus freeing computer 102 from having to use its own internal computing resources to execute DTREL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
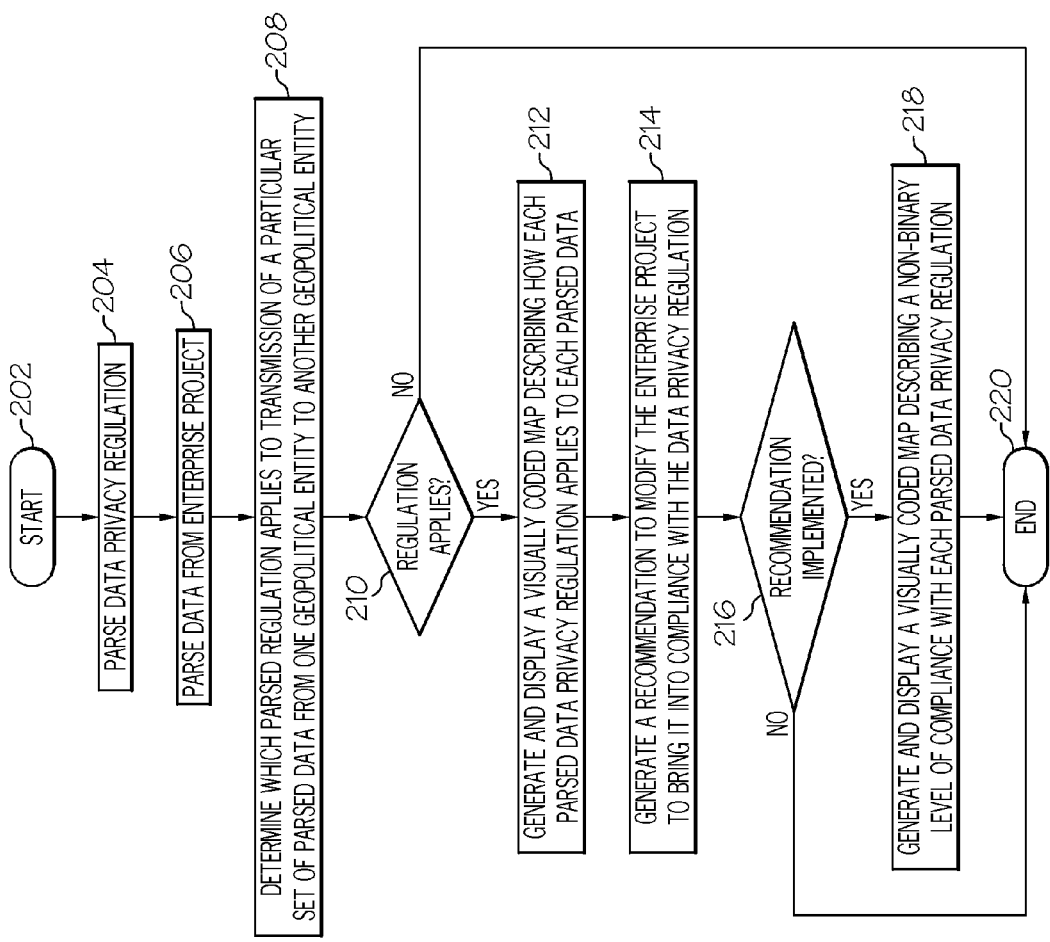
FIG. 2 is a high level flow chart of one or more exemplary steps taken by a processor or other computer hardware to determine an applicability of a data privacy regulation when transmitting data from one geopolitical entity to another geopolitical entity.
Figure 3:
FIG. 3 illustrates an exemplary visually-coded matrix of how particular data privacy regulations apply to a particular category of data used by an enterprise project.
Figure 4:
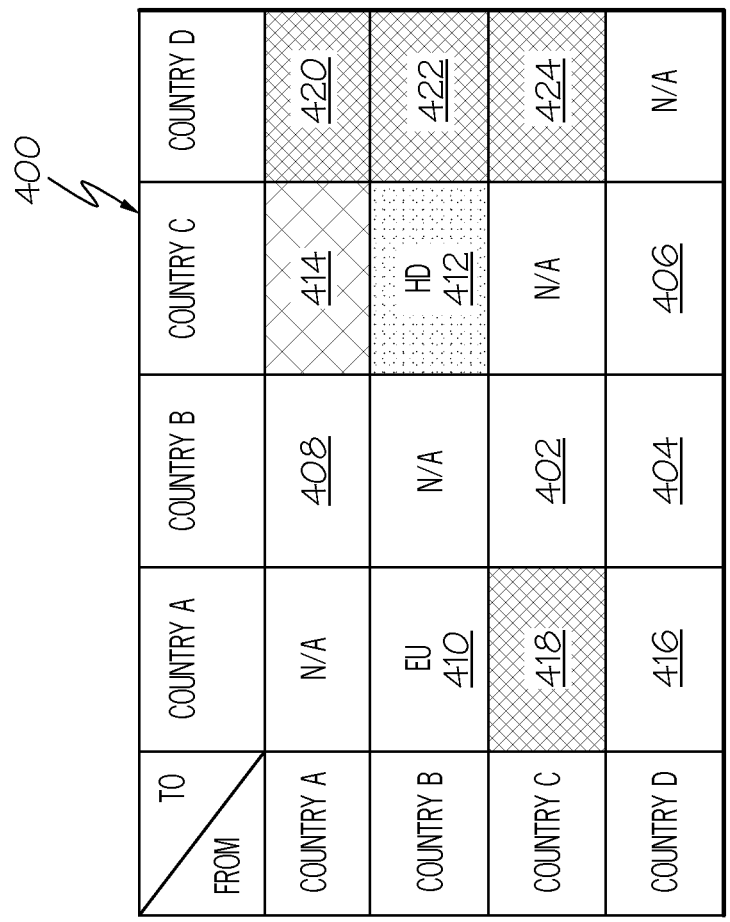
FIG. 4 depicts an exemplary visually-coded matrix of non-binary compliance levels of an enterprise project with respect to various data privacy regulations.

With reference now to FIG. 2, a high level flow chart of one or more exemplary steps taken by a processor or other computer hardware to determine an applicability of a data privacy regulation when transmitting data, which is used with an enterprise project, from one geopolitical entity to another geopolitical entity is presented. After initiator block 202, a data privacy regulation is received, and/or parsed, by computer hardware (block 204). This data privacy regulation, which can come to the computer hardware in the form of a first set of binary data, describes regulatory restrictions on data being transmitted from a first geopolitical entity (e.g., a first country) to a second geopolitical entity (e.g., a second country). For example, a first geopolitical entity (e.g., a first country) may have a regulation that prohibits transmitting any data, which describes a person's credit card transactions, to any or a particular other geopolitical entity (e.g., another country). That is, this regulation may prohibit 1) sending any credit card information to any entity/enterprise in another country (or other geopolitical entity); 2) sending particular types (e.g., description of a purchase, credit card account numbers, etc.) of credit card information to certain countries; 3) sending particular types of credit card information to certain countries unless certain protocols have been followed (e.g., the receiving country has entered into a treaty with the sending country to follow certain data privacy guidelines); etc.

As described in block 206, a set of categorized data being used by an enterprise project is received, and/or parsed, by the computer hardware. This categorized data may be received as a second set of binary data that describes the categorized data. For example, the categorized data may be parsed into different categories, such as persons' names, social security numbers, credit card account numbers, answers to security questions (e.g., mothers' maiden name), etc. The data privacy regulation(s) described above in block 204, either together or parsed, establishes limitations on a transmission of at least one category of data, from the set of categorized data, from the first country (or other type of "first geopolitical entity") to the second country (or other type of "second geopolitical entity").

With reference now to block 208, the computer hardware processes the first set of binary data and the second set of binary data to determine if transmission of at least one category of data from the first country to the second country is regulated by the data privacy regulation (parsed or unparsed). If a data privacy regulation applies to the transmission, from one geopolitical entity to another, of data being used by the enterprise project (query block 210), then a visually coded matrix describes how at least one category of data applies to the data privacy regulation. For example, consider the exemplary visually-coded matrix 300, from FIG. 3, which depicts how particular data privacy regulations apply to a particular category of data used by an enterprise project. Blocks 302, 304, and 306 are all clear, in order to visually code/represent the fact that data of this particular category of data can be freely transferred between the two indicated countries. In this instance, the sending country and receiving country of this particular category of data are assured that the data matches at least one of the following four scenarios: 1) the type of data being used by the enterprise project is not considered sensitive/private by either country; 2) the type of data being used by the enterprise project can be transmitted from one country to another because of a treaty or regulation between the countries being properly enforced; 3) the type of data being used by the enterprise project can be transmitted from one country to another because both countries have a history of protecting this type of data, even though there may be no laws/regulations regarding such data in one or both of the countries; etc.; 4) the type of data being used by the enterprise project can be transmitted from one country to another because the enterprise itself has a private agreement in place between the countries, or has a certification in place that satisfies the regulations.

For example, assume that an enterprise in Country C wants to transmit descriptions of products purchased using a credit card to Country B. As indicated by the clear visual coding of block 302, this data can be freely transmitted form Country C to Country B. However, if Country A wants to transmit this type of data to Country B, then the visual coding in block 308 indicates that there are laws and/or regulations that apply to such transmissions. Similar restrictions apply when transmitting this type of data from Country B to Country A (see block 310), and from Country B to Country C (see block 312). However, note that block 310 has the letter "EU" overlaid on it. This indicates that in order to transmit this type of data from Country B to Country A, the enterprise project is required to comply with European Union (EU) Directive rules. These EU Directive rules require that either a Safe Harbor Framework be in place, or that model contracts and/or binding corporate directives are in place. This Safe Harbor Framework allows United States (US) companies to opt into a program in which certain types of data can be transmitted between the EU and the US, assuming that the US enterprise/company adheres to seven principles outlined in the EU Directive. That is, the US enterprise/company must agree to 1) give individuals notice that personal information is being collected; 2) give individuals a choice to opt out of the data submission/collection; 3) agree to forward sensitive data only to entities who take appropriate steps to protect the data; 4) take reasonable efforts to prevent the data from being stolen; 5) acquire/transmit only data needed for a legitimate project; 6) allow individuals the right to access/amend their own data; and 7) enact means for enforcing steps 1-6.

Similarly, the "HD" shown in block 312 indicates that the sender/recipient of the transmitted data must agree to provide a mechanism for the individual, whose personal data is being transmitted between the two countries, to be able to access and/or amend his own data. This requirement is known as a Habeas Data rule, and thus the "HD" indicator.

Note further, in visually-coded matrix 300, the unique visual coding of block 314 indicates that there are very restrictive regulations in play when transmitting data from Country A to Country C. As such, the regulations may suggest that it is simply too onerous to include this type of data in an enterprise project, if such data is expected to be transmitted from Country A to Country C.

Note further, in visually-coded matrix 300, the unique visual coding of block 316 indicates that, whether there are enacted data privacy regulations or not, there will be little expectation of the transmitted data being properly handled in the receiving country. That is, Country A may have a long history of non-enforcement of data privacy regulations that have been enacted. Thus, when transmitting personal/sensitive data from Country D to Country A, there should be no expectation that entities (data recipients such as enterprises) within Country A will actually protect the data as prescribed by their own data privacy regulations. As such, the sending entity who generated the data may determine that the enterprise project should be modified, such that this type of data is simply not sent to Country A.

Finally, the unique visual coding of block 318 indicates that Country A should never be trusted with data from Country C, either due to a lack of a data privacy regulation/treaty with Country D, or a past history of Country A failing to protect personal/private data received from Country D. Likewise, Country D is never to be trusted with personal/private data, no matter where it originated, as indicated by the visual coding of block 320, block 322, and block 324. This lack of trust of Country D is due to a lack of data privacy regulations within Country D, and/or a history of malfeasance (e.g., releasing private/personal data for economic, political, military gain) by entities within Country D. As such, any enterprise project should be modified such that no personal/private data is ever transmitted to Country D.

Returning now to FIG. 2, as indicated in block 214, a recommended procedure to modify the enterprise project is generated and displayed to a user based on the results of operations described in blocks 208, 210, and 212. This recommended procedure, when implemented, is designed to bring the transmission of at least one category of data from the first country to the second country into compliance with the data privacy regulation and/or to generate a high level of confidence that the data being transmitted will be properly handled by the recipient. The recommended procedure may be generated by comparing what the data privacy regulation requires with what the sending entity is currently doing.

One example of such a recommended procedure described in block 214 is for the enterprise to implement contractual agreements with either the first country or the second country to satisfy the countries' data privacy regulations. For example, the two countries may have a treaty/agreement that allows parties from both countries to agree to waive the protections of the data privacy regulation. Note that in this embodiment, the enterprise registers the enterprise project with the data protection authorities of both countries.

Another example of a recommended procedure described in block 214 is to obtain a contractual waiver from a resident of the first country to satisfy the data privacy regulation. That is, even if there is a data privacy regulation in force in one or both countries, there may be a provision for each individual, to whom the private/personal data applies, to provide an individual waiver ("opting in or opting out") that allows the data to be freely transmitted between the countries.

Another example of a recommended procedure described in block 214 is to implement the Safe Harbor Framework (or other similar type of certification process) described above.

If the recommended procedure described in block 214 is implemented (query block 216), then a matrix of the set of categorized data can be displayed (block 218). This matrix is visually coded to indicate a non-binary level of compliance, due to the currently implemented enterprise data privacy procedure, by a particular category from at least one category of data with a particular component of multiple components of the data privacy regulation. Note that "non-binary" is defined as being a gradient level of compliance. That is, the compliance with a data privacy regulation is not simply a "Yes/No" evaluation, but rather is a matter of degree. Thus, a particular set of private/personal data being transmitted is graded according to how well the enterprise project comports with a data privacy regulation after implementing the recommended steps to ensure the appropriate level of protection for the transmitted personal/private data. For example, consider matrix 400 shown in FIG. 4. As indicated by the clear visual coding of blocks 402, 404, 406, 408, 410, and 416, data of a particular category being transmitted between the two indicated countries now (after the sender and/or receiver enterprises from the two countries have implemented the recommended privacy procedure) fully complies with requisite data privacy regulations and/or meet the levels of expected privacy/protection for this type of data. However, the visual coding of block 414 indicates that data being transmitted from Country A to Country C is only partially in compliance with relevant data privacy regulations after an enterprise has implemented the data privacy procedure. As indicated by the visual coding of block 412, data being transmitted from Country B to Country C is even less in compliance with relevant data privacy regulations than that level indicated by the visual coding of block 414. Finally, despite the enterprise(s) implementing the recommended data privacy procedure(s), data should never be transmitted from Country C to Country A, or from any country to Country D, as indicated by the visual coding of blocks 418, 420, 422, and 424.

Returning to FIG. 2, the process ends at terminator block 220.

Note that in one embodiment, if there is a change to a data privacy regulation, then the non-binary compliance level of at least one category of data may also change. If so, then the visual coding of the matrices shown in FIG. 3 and FIG. 4 automatically adjust their respective visual coding of the blocks in order to reflect said change to the data privacy regulation.

Note that in one embodiment, the data privacy regulation regulates transmissions of personally identifiable information (PII). In this implementation of this embodiment, a determination is made that at least one category of data from the set of categorized data is PII according to a context of the one category of data from the set of categorized data. That is, the context of at least one category of data is defined by use and availability of another category of data from the set of categorized data. For example, assume that the category of data is a person's birthday. Standing alone, there is nothing to suggest that this is PII. However, if another category of data, such as a person's hometown is associated with the birthday category, then if the person's hometown is small enough, it may be easy to determine which individual is identified by that birthday. In other words, the data becomes PII by context of associated data. Thus, any other information (e.g., buying habits, medical records, etc.) about that person and tied to that birthday is no longer anonymous.

Note that while the invention has been described above in the context of data transmission between two countries, in one embodiment of the present invention, this data transmission is between any two geopolitical entities capable of regulating the transmission/receipt of sensitive/private data. Such geopolitical entities include, but are not limited to, states, provinces, political subdivisions, etc.

Note further that the matrices 300 and 400 described above have been described as being used to evaluate a single data privacy regulation. In an alternate embodiment, however, such matrices may be multi-dimensional and/or composite matrices, such that multiple data privacy regulations and/or categories of data can be displayed using multiple gradients of visual coding to indicate overall/composite relationships (such as described in matrix 300) and compliance/confidence levels (such as described in matrix 400).

Figure 5:
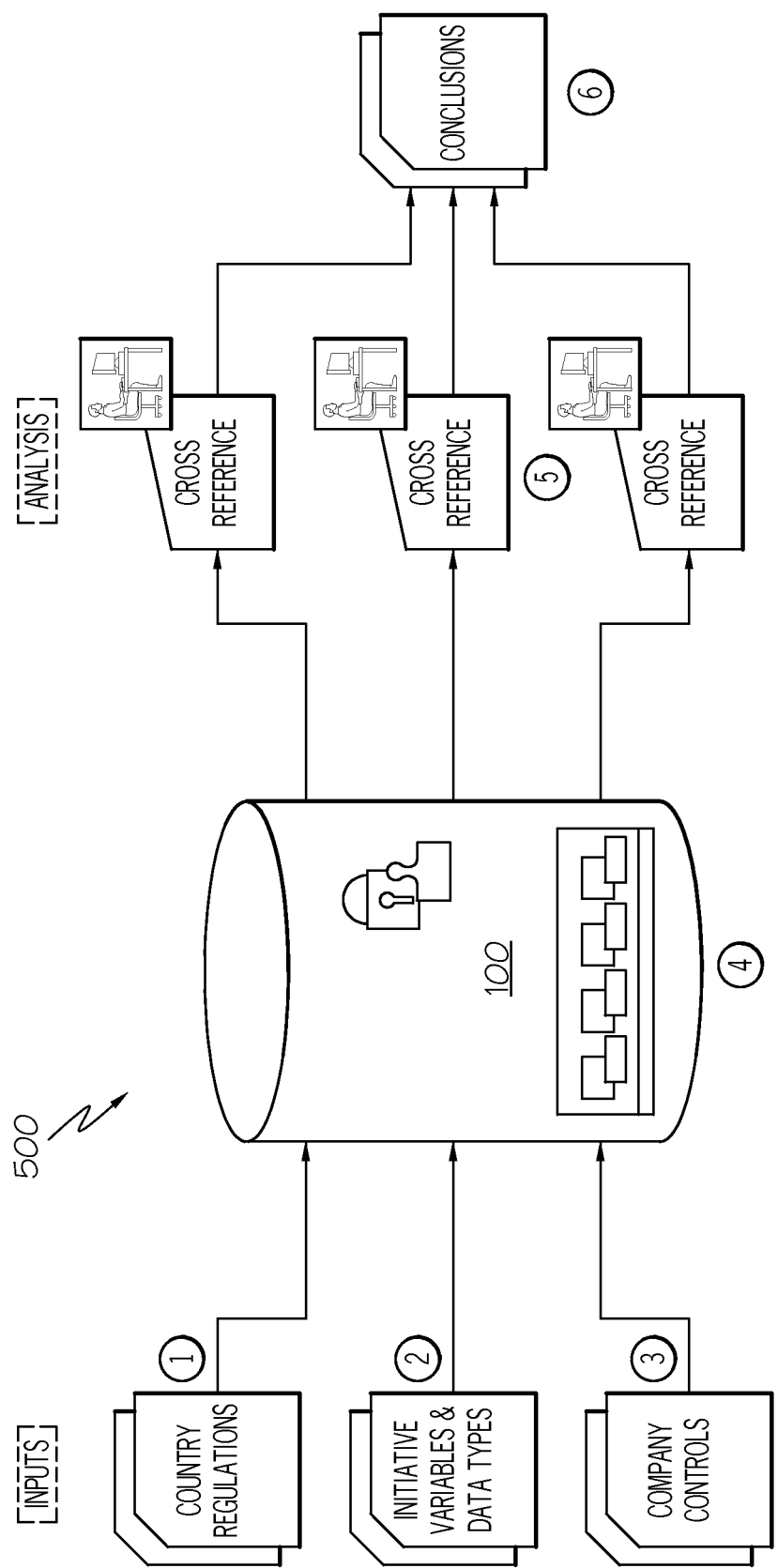
FIG. 5 illustrates another description of steps taken by the present invention to determine data privacy regulation applicability and/or non-binary compliance levels.

With reference now to FIG. 5, a conceptual model 500 provides an exemplary manner in which an analysis of data privacy regulations and their relationship to data to be transmitted between two countries is performed. In Step 1, each country's regulations are entered into an Inventory Of Obligations (IOO). In one embodiment, this entry of regulations is performed by keeping up-to-date on the latest in the international regulatory framework by subscribing to news services, etc. These regulations are then parsed into subcomponents, where each subcomponent addresses a particular type of data, and/or are specific to two particular countries (e.g., the sender and the receiver of the sensitive data). The subcomponents are normalized (i.e., assigned to uniform categories) to create a framework of the IOO called "Privacy Principles", which are plain language equivalents of what a national regulation may say. For instance, a typical IOO Privacy Principle might say "Privacy Officer required", whereas various country regulations might say that there needs to be a "data custodian", or an "individual assigned responsibility", etc.

In addition to each country's regulations, the IOO also keeps a data dictionary that describes each country's definition of private data. As noted above, each of the U.S. States is treated as a separate geopolitical entity (i.e., like a different "country") in the analysis of the data privacy regulations. Step 1 is an ongoing process which is occurring no matter when a particular Company Initiative (e.g., enterprise project) is requested for analysis. This maintains an up-to-date inventory of country regulations in preparation of any enterprise project that may be run through the process.

In Step 2 depicted in the conceptual model 500 of FIG. 5, a company's individual initiative (project, scenario) is entered. This entry allows the system to keep track of any query into the IOO database based on a subset of what the company needs to know for a particular project. The IOO also serves as a permanent record of what the system has already accomplished so that if the data privacy regulations change, the company can be alerted as to how the change might affect a particular existing project. This Step 2 thus customizes the analysis for a particular combination of variables and countries that a particular project requires. An initiative is entered as a list of countries involved and the types of data being used. Other variables are also entered at this time to help standardize the initiative and to compare it to elements in the database.

In Step 3 in the conceptual model of FIG. 5, information as to what company controls are already in place is provided to the IOO. This step helps at the analysis Step 5 (below), during which mitigation recommendations are created and presented by the system. For example, if it is already known that a Privacy Officer exists and is required for a particular country mentioned in a scenario, then it is known that the company already complies with the data privacy regulation component. Similarly, if EU Model Contracts are needed between certain countries and these are already in place, then it is known that the company already complies, and this compliance will be indicated in a matrix such as the matrix 400 shown in FIG. 4. Thus, the Company Controls keeps track of what is needed, or is already in place, for compliance purposes.

In Step 4 in the conceptual model of FIG. 5, the data repository containing the information from Steps 1-3 is normalized in the Inventory of Obligations (IOO) database.

In Step 5 in the conceptual model of FIG. 5, an analysis process determines if data from an enterprise initiative is regulated by one or more data privacy regulations, as described above in FIGS. 2-3. For example, the system may be provided, from the IOO, a cross-reference map of countries involved in the initiative. The system may also tell whether appropriate company mitigations already exist for those combinations of countries, and/or the system may provide generic mitigations ("make sure a Model Contract is in place between Country X and Country Y").

In Step 6 in the conceptual model of FIG. 5, recommendations/conclusions for a particular initiative/scenario are generated.

Note that in one embodiment of the present invention, the analysis described herein is used to automatically generate one or more recommendations regarding how present and/or future initiatives (enterprise projects) are architected. For example, if the analysis of data from a past or present initiative reveals that a particular category data is subject to data privacy regulations that are prohibitively expensive, cumbersome, or difficult to implement without rigid oversight, then a rule may be established that all future initiatives undertaken by the enterprise be architected to not use this particular category of data.

Similarly, if the analysis of data from a past or present initiative reveals that transmitting a particular category data to a particular geopolitical entity (e.g., a particular country) is deemed inherently problematic (i.e., the receiving country cannot be trusted and/or has data privacy regulations that are prohibitively expensive, cumbersome, or difficult to implement without rigid oversight), then a rule may be established that all future initiatives undertaken by the enterprise be architected to never transmit this category of data to that particular country. Conversely, if the analysis of data from a past or present initiative reveals that transmitting a particular category data to a particular geopolitical entity (e.g., a particular country) is deemed inherently non-problematic (i.e., the receiving country is trustworthy and/or has data privacy regulations that are easy to implement), then a rule may be established that all future initiatives undertaken by the enterprise be architected to always transmit this category of data to that particular country.

The various countries can also be ranked according to how onerous/trustworthy they are in the context of receiving transmissions of particular categories of data. This ranking is then used to architect future initiatives with regards to what categories of data are allowed to be transmitted to various countries. For example, different countries can be ranked by how aggressively they enforce their own, or global, data privacy regulations, and/or how they historically have protected data privacy rights (with or without data privacy regulations). If a particular country ranks low in this regard, it may still be appropriate to transmit a particular category of data to this country if that particular category of data has little or no privacy factors (e.g., weather data, etc.). However, in other embodiments the "most trustworthy" country will be selected for receiving private (sensitive) data of a particular category.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer hardware-implemented method of determining an applicability of a data privacy regulation when transmitting data used with an enterprise project, the computer hardware-implemented method comprising:
   receiving a first set of binary data that describes a data privacy regulation, wherein the data privacy regulation describes regulatory restrictions on data being transmitted from a first country to a second country, and wherein the first set of binary data describes multiple components of the data privacy regulation;
   receiving a second set of binary data that describes a set of categorized data, wherein the set of categorized data is used by an enterprise project, and wherein the data privacy regulation establishes limitations on a transmission of at least one category of data, from the set of categorized data, from the first country to the second country;
   processing, by computer hardware, the first set of binary data and the second set of binary data to determine if transmission of said at least one category of data from the first country to the second country is regulated by the data privacy regulation, wherein determining whether the transmission of said at least one category of data from the first country to the second country is regulated by the data privacy regulation is performed by determining whether or not the categorized data is within a scope of the data privacy regulation;
   identifying a currently implemented enterprise data privacy procedure;
   generating and displaying a matrix of the set of categorized data, wherein the matrix is visually coded to indicate a non-binary level of compliance, due to the currently implemented enterprise data privacy procedure, by a particular category from said at least one category of data with a particular component of said multiple components of the data privacy regulation; and
   in response to a change to the data privacy regulation changing a non-binary compliance level of said at least one category of data with said particular component of said multiple components of the data privacy regulation, automatically adjusting visual coding of blocks in the matrix in order to reflect said change to the data privacy regulation.

2. The computer hardware-implemented method of claim 1, further comprising:
   generating and displaying a recommended procedure to modify the enterprise project, wherein the recommended procedure, when implemented, brings the transmission of said at least one category of data from the first country to the second country into compliance with the data privacy regulation.

3. The computer hardware-implemented method of claim 2, wherein the recommended procedure is a contractual agreement between the first country and the second country to satisfy the data privacy regulation.

4. The computer hardware-implemented method of claim 2, wherein the recommended procedure is a contractual waiver from a resident of the first country to satisfy the data privacy regulation.

5. The computer hardware-implemented method of claim 2, wherein the recommended procedure is compliance with a certification process that has been established by the second country.

6. The computer hardware-implemented method of claim 2, further comprising:
   generating a recommendation to modify enterprise policies such that all future enterprise projects comply with the recommended procedure to modify the enterprise project.

7. The computer hardware-implemented method of claim 1, further comprising:
   in response to determining that transmission of said at least one category of data from the first country to the second country triggers the data privacy regulation, visually coding and displaying said at least one category of data to describe the data privacy regulation.

8. The computer hardware-implemented method of claim 1, wherein the set of categorized data is created by the enterprise project.

9. The computer hardware-implemented method of claim 1, wherein said data privacy regulation regulates transmissions of personally identifiable information (PII), and wherein the computer hardware-implemented method further comprises:
   determining that said at least one category of data from the set of categorized data is PII according to a context of said at least one category of data from the set of categorized data.

10. The computer hardware-implemented method of claim 9, wherein the context of said at least one category of data is defined by use and availability of another category of data from the set of categorized data.

11. A computer program product for identifying an applicability of a data privacy regulation when transmitting data used with an enterprise project, the computer program product comprising:
   a non-transitory computer readable storage medium;
   first program instructions to receive a first set of binary data that describes a data privacy regulation, wherein the data privacy regulation describes regulatory restrictions on data being transmitted from a first state to a second state, and wherein the first set of binary data describes multiple components of the data privacy regulation;
   second program instructions to receive a second set of binary data that describes a set of categorized data, wherein the set of categorized data is created by an enterprise project, and wherein the data privacy regulation establishes limitations on a transmission of at least one category of data, from the set of categorized data, from the first state to the second state;
   third program instructions to process the first set of binary data and the second set of binary data to determine if transmission of said at least one category of data from the first state to the second state is regulated by the data privacy regulation, wherein determining whether the transmission of said at least one category of data from the first state to the second state is regulated by the data privacy regulation is performed by determining whether or not the categorized data is within a scope of the data privacy regulation;
   fourth program instructions to identify a currently implemented enterprise data privacy procedure;

fifth program instructions to generate and display a matrix of the set of categorized data, wherein the matrix is visually coded to indicate a non-binary level of compliance, due to the currently implemented enterprise data privacy procedure, by a particular category from said at least one category of data with a particular component of said multiple components of the data privacy regulation; and sixth program instructions to, in response to a change to the data privacy regulation changing a non-binary compliance level of said at least one category of data with said particular component of said multiple components of the data privacy regulation, automatically adjust visual coding of blocks in the matrix in order to reflect said change to the data privacy regulation; and wherein the first, second, third, fourth, fifth, and sixth program instructions are stored on the non-transitory computer readable storage medium.

12. The computer program product of claim 11, further comprising:

seventh program instructions to generate and display a recommended procedure to modify the enterprise project, wherein the recommended procedure, when implemented, brings the transmission of said at least one category of data from the first state to the second state into compliance with the data privacy regulation; and wherein the seventh program instructions are stored on the non-transitory computer readable storage medium.

13. The computer program product of claim 11, wherein the first set of binary data describes multiple components of the data privacy regulation, and wherein the computer program product further comprises:

seventh program instructions to identify a currently implemented enterprise data privacy procedure; and eighth program instructions to generate and display a matrix of the set of categorized data, wherein the matrix is visually coded to indicate a level of compliance, due to the currently implemented enterprise data privacy procedure, by a particular category from said at least one category of data with a particular component of said multiple components of the data privacy regulation; and wherein the seventh and eighth program instructions are stored on the non-transitory computer readable storage medium.

14. A system comprising:

a processor, a computer readable memory, and a computer readable storage media;

first program instructions to receive a first set of binary data that describes a data privacy regulation, wherein the data privacy regulation describes regulatory restrictions on data being transmitted from a first geopolitical entity to a second geopolitical entity, and wherein the first set of binary data describes multiple components of the data privacy regulation;

second program instructions to receive a second set of binary data that describes a set of categorized data, wherein the set of categorized data is created by an enterprise project, and wherein the data privacy regulation establishes limitations on a transmission of at least one category of data, from the set of categorized data, from the first geopolitical entity to the second geopolitical entity;

third program instructions to process the first set of binary data and the second set of binary data to determine if transmission of said at least one category of data from the first geopolitical entity to the second geopolitical entity is regulated by the data privacy regulation, wherein determining whether the transmission of said at least one category of data from the first geopolitical entity to the second geopolitical entity is regulated by the data privacy regulation is performed by determining whether or not the categorized data is within a scope of the data privacy regulation;

fourth program instructions to identify a currently implemented enterprise data privacy procedure;

fifth program instructions to generate and display a matrix of the set of categorized data, wherein the matrix is visually coded to indicate a non-binary level of compliance, due to the currently implemented enterprise data privacy procedure, by a particular category from said at least one category of data with a particular component of said multiple components of the data privacy regulation; and sixth program instructions to, in response to a change to the data privacy regulation changing a non-binary compliance level of said at least one category of data with said particular component of said multiple components of the data privacy regulation, automatically adjust visual coding of blocks in the matrix in order to reflect said change to the data privacy regulation; and wherein the first, second, third, fourth, fifth, and sixth program instructions are stored on the computer readable storage medium for execution by the processor via the computer readable memory.

15. The system of claim 14, further comprising:

seventh program instructions to generate and display a recommended procedure to modify the enterprise project, wherein the recommended procedure, when implemented, brings the transmission of said at least one category of data from the first geopolitical entity to the second geopolitical entity into compliance with the data privacy regulation; and wherein the seventh program instructions are stored on the computer readable storage media for execution by the processor via the computer readable memory.

16. The system of claim 14, wherein the first set of binary data describes multiple components of the data privacy regulation, and wherein the system further comprises:

seventh program instructions to identify a currently implemented enterprise data privacy procedure; and eighth program instructions to generate and display a matrix of the set of categorized data, wherein the matrix is visually coded to indicate a level of compliance, due to the currently implemented enterprise data privacy procedure, by a particular category from said at least one category of data with a particular component of said multiple components of the data privacy regulation; and wherein the seventh and eighth program instructions are stored on the computer readable storage media for execution by the processor via the computer readable memory.

17. The system of claim 14, wherein said data privacy regulation regulates transmissions of personally identifiable information (PII), and wherein the system further comprises:

seventh program instructions to determine that said at least one category of data from the set of categorized data is PII according to a context of said at least one category of data from the set of categorized data; and wherein the seventh program instructions are stored on the computer readable storage media for execution by the processor via the computer readable memory.

* * * * *